April 26, 1949.   M. W. WOOD   2,468,282
DEVICE FOR CORING AND CUTTING GRAPEFRUIT
Filed May 20, 1946   2 Sheets-Sheet 1

INVENTOR
Max M. Wood
John H. Ruckman
BY
ATTORNEY

April 26, 1949.　　　M. W. WOOD　　　2,468,282
DEVICE FOR CORING AND CUTTING GRAPEFRUIT
Filed May 20, 1946　　　　　　　　　　　　　　2 Sheets-Sheet 2

INVENTOR
Max M. Wood
BY John H. Ruckman
ATTORNEY

Patented Apr. 26, 1949

2,468,282

UNITED STATES PATENT OFFICE 2,468,282

DEVICE FOR CORING AND CUTTING GRAPEFRUIT

Max W. Wood, New Orleans, La.

Application May 20, 1946, Serial No. 671,060

1 Claim. (Cl. 146—40)

My invention relates to devices for coring and cutting grape fruit. An object of the invention is to provide for quickly and conveniently placing grape fruit halves in condition for serving at the table. In carrying out my invention, I provide a top support having a handle by which it may be rotated. The support has secured to its under side, a central cover and also cutting blades for cutting the meat of the grape fruit loose just inside the rind when the support is given a half turn after the device has been pushed down into the meat. Underneath the support a plurality of radially disposed blades or fins are mounted in such manner that they will remain stationary in the meat to separate it into sections while the corer and cutting blades are given a rotative movement.

The novel features which I believe to be characteristic of my invention are set forth with particularity in the appended claim. The invention itself, however, both as to organization and method of operation, together with additional objects and advantages thereof, will be best understood from the following description of a specific embodiment when read in connection with the accompanying drawings in which, Fig. 1 is a perspective view of the device showing it applied to the top of a half grape fruit.

Figure 1:
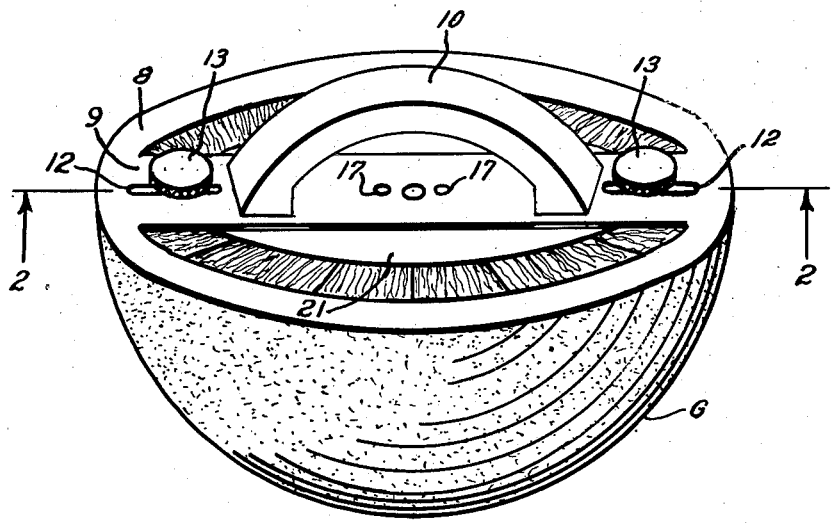
Figure 2:
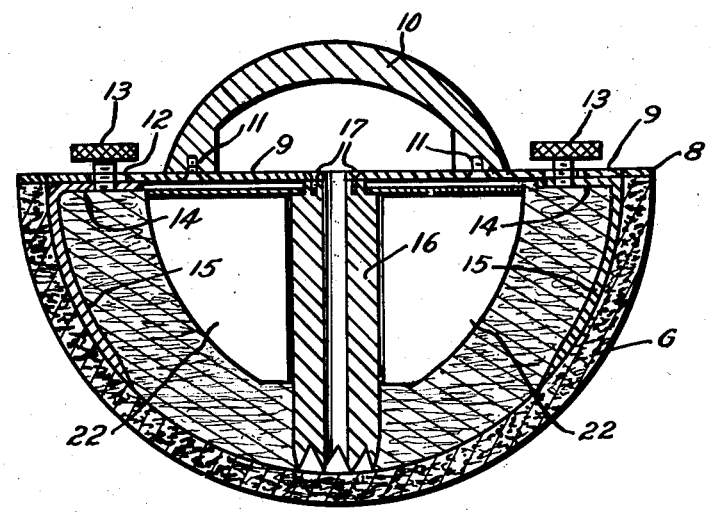
Fig. 2 is a view in section on the line 2—2 of Fig. 1.
Figure 3:
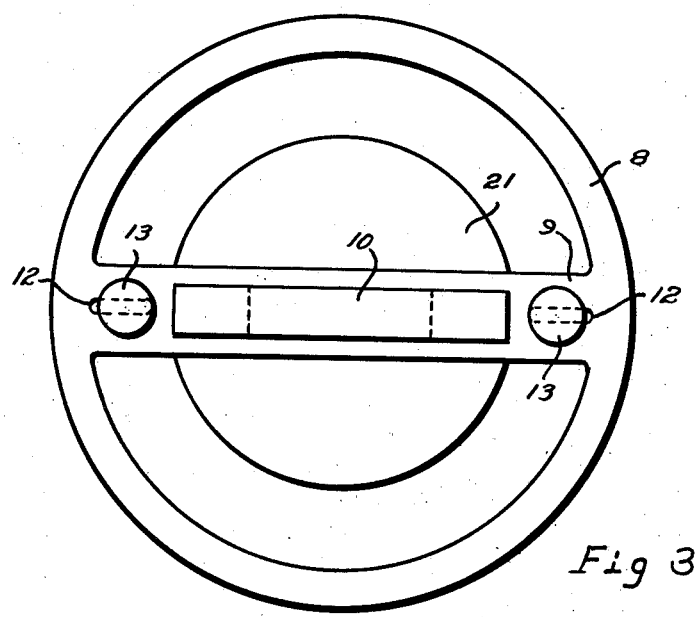
Fig. 3 is a top view of the device.
Figure 5:
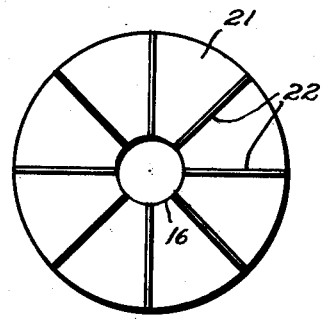
Fig. 5 is a bottom view of the central portion.
Figures 4, 6, 7:
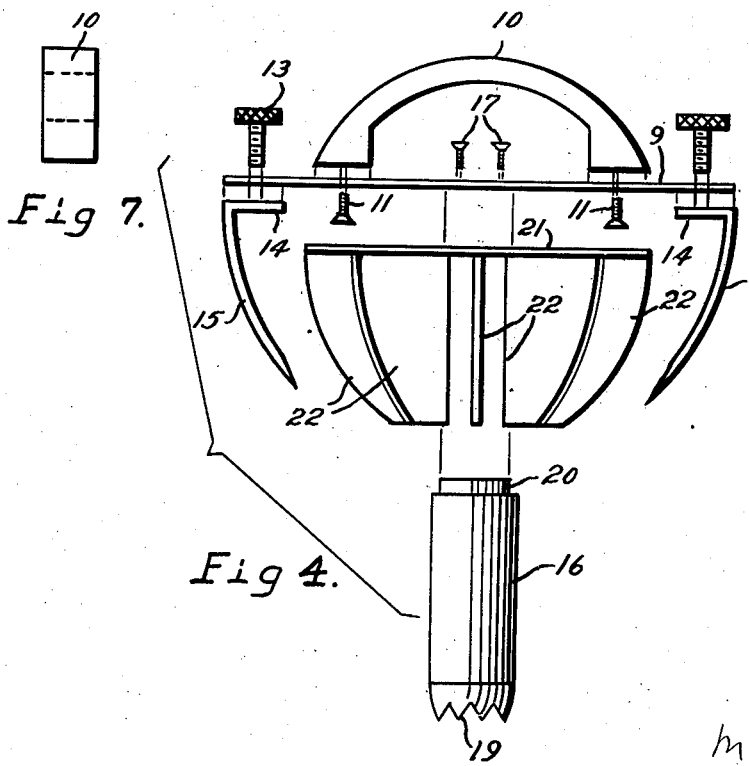
Fig. 4 is an exploded view.
Fig. 6 is a face view of one of the cutting blades.
Fig. 7 is an end view of a handle member.

Referring to the drawings which illustrate the principles involved in the invention, the numeral 8 designates an annular support having a cross bar 9 extending diametrically across it. A handle member 10 is secured to the bar 9 by screws 11. The end portions of the bar 9 are provided with slots 12 through which pass thumb screws 13 adapted to be turned into threaded holes in horizontal arms 14 of cutting blades 15 which are so shaped as to fit just inside the rind of the grape fruit G. A hollow cylinder 16 extends down centrally from the bar 9 being secured thereto by screws 17 and is adapted for coring the grape fruit. It has cutting teeth 19 on its lower end and at its upper end is provided with a shoulder 20. A disk 21 is interposed between this shoulder and the lower side of the bar 9 in such manner that the disk may remain stationary while the bar 9 is given rotative movement. The disk 21 has a plurality of radially disposed blades or fins 22 secured to its lower side and spaced slightly from the cylinder 16. The blades 22 are curved peripherally and are adapted to be pushed down into the grape fruit to divide it into sections and remain stationary while the coring cylinder 16 and the cutting blades 15 are given a half rotation by turning the handle 10. The slot 12 provide adjustment for different size grape fruit.

The operation and advantages of this invention will be apparent and have already been largely referred to in connection with the drawings. The grape fruit may be much more expeditiously prepared for serving than is the case when a knife is used for this purpose. The device may be made from any suitable material but stainless steel is preferred for the operating parts in order that they may be washed without liability of rusting.

I claim:

In a device for coring and cutting grape fruit, the combination of an annular member, a cross bar extending diametrally across said annular member and having its end secured thereto, a handle member secured to said cross bar, the end portions of said cross bar containing radially disposed slots, thumb screws passing downwardly through said slots, curved cutting blades, horizontal arms extending inwardly from the upper ends of said blades and containing threaded holes in which said thumb screws are adapted to be turned down, a coring cylinder secured centrally to said cross bar and extending downwardly therefrom, the lower end of said cylinder having cutting teeth and being provided with an annular shoulder at its upper end, a disk interposed between said shoulder and the lower side of said cross bar and with relation to which the cross bar is rotatable, and a plurality of radially disposed blades secured to the lower side of said disk.

MAX W. WOOD.

REFERENCES CITED

The following references are of record in the file of this patent:

UNITED STATES PATENTS

| Number | Name | Date |
|---|---|---|
| 921,917 | Troxell | May 18, 1909 |
| 1,389,765 | Krota | Sept. 6, 1921 |
| 1,423,490 | Vafiades et al. | July 18, 1922 |